(12) United States Patent
Bosshart

(10) Patent No.: US 10,033,626 B2
(45) Date of Patent: *Jul. 24, 2018

(54) CONDITIONAL INSTRUCTIONS FOR PACKET PROCESSING

(71) Applicant: TEXAS INSTRUMENTS INCORPORATED, Dallas, TX (US)

(72) Inventor: Patrick W. Bosshart, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/062,245

(22) Filed: Mar. 7, 2016

(65) Prior Publication Data

US 2016/0191373 A1    Jun. 30, 2016

Related U.S. Application Data

(63) Continuation of application No. 14/169,975, filed on Jan. 31, 2014, now Pat. No. 9,313,124.

(60) Provisional application No. 61/759,673, filed on Feb. 1, 2013.

(51) Int. Cl.
*H04L 12/28* (2006.01)
*H04L 12/733* (2013.01)
*H04L 12/741* (2013.01)
*H04L 12/723* (2013.01)

(52) U.S. Cl.
CPC .............. *H04L 45/20* (2013.01); *H04L 45/74* (2013.01); *H04L 45/50* (2013.01)

(58) Field of Classification Search
CPC .......... H04L 45/74; H04L 45/20; H04L 45/50

USPC ................ 370/221-235, 244-252, 374-392; 709/221-229

See application file for complete search history.

(56) References Cited

U.S. PATENT DOCUMENTS

| | | | | |
|---|---|---|---|---|
| 7,227,867 | B1 * | 6/2007 | Ferguson | H04L 45/10 370/395.5 |
| 7,304,996 | B1 * | 12/2007 | Swenson | H04L 45/7453 370/229 |
| 7,539,750 | B1 * | 5/2009 | Parker | G06F 15/16 709/224 |
| 7,613,209 | B1 * | 11/2009 | Nguyen | H04L 47/10 370/474 |
| 7,697,544 | B1 * | 4/2010 | Ferguson | H04L 45/10 370/395.5 |
| 7,821,931 | B2 * | 10/2010 | Swenson | H04L 45/7453 370/230 |

(Continued)

*Primary Examiner* — Man Phan

(74) *Attorney, Agent, or Firm* — Michael A. Davis, Jr.; Charles A. Brill; Frank D. Cimino

(57) ABSTRACT

A network switch includes a plurality of ports, a parser coupled to the plurality of ports, and a processor coupled to the ports and configured to process a received packet via one of the ports. The received packet includes a first header field, a second header field, and a destination header field, each of the first, second, and destination header fields including a TTL field. The parser is configured to decide a valid bit for each of the first header field, the second header field and the destination header field, based on an availability for each of the first header field, the second header field and the destination header field. The processor is configured to execute an instruction to cause content of a select one of the first or second header field's TTL field to be copied to the destination header field.

5 Claims, 2 Drawing Sheets

(56) References Cited

U.S. PATENT DOCUMENTS

| | | | | |
|---|---|---|---|---|
| 7,990,971 | B2* | 8/2011 | Ra ........................... | H04L 45/00 370/392 |
| 7,995,586 | B2* | 8/2011 | Ferguson ................ | H04L 45/10 370/395.5 |
| 8,924,694 | B2* | 12/2014 | Parker ................ | G06F 9/30018 712/224 |
| 2002/0163935 | A1* | 11/2002 | Paatela .................. | H04L 29/06 370/465 |
| 2012/0163165 | A1* | 6/2012 | Ra ........................... | H04L 45/50 370/225 |

* cited by examiner

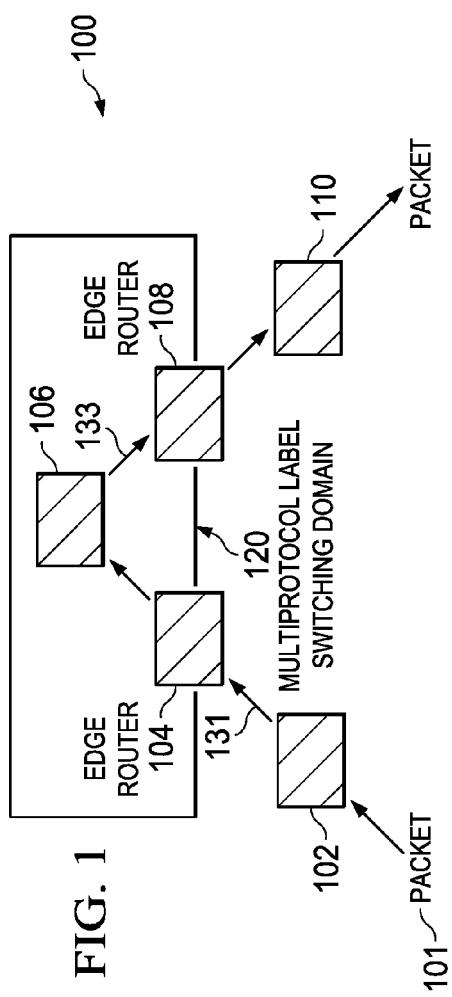
FIG. 1
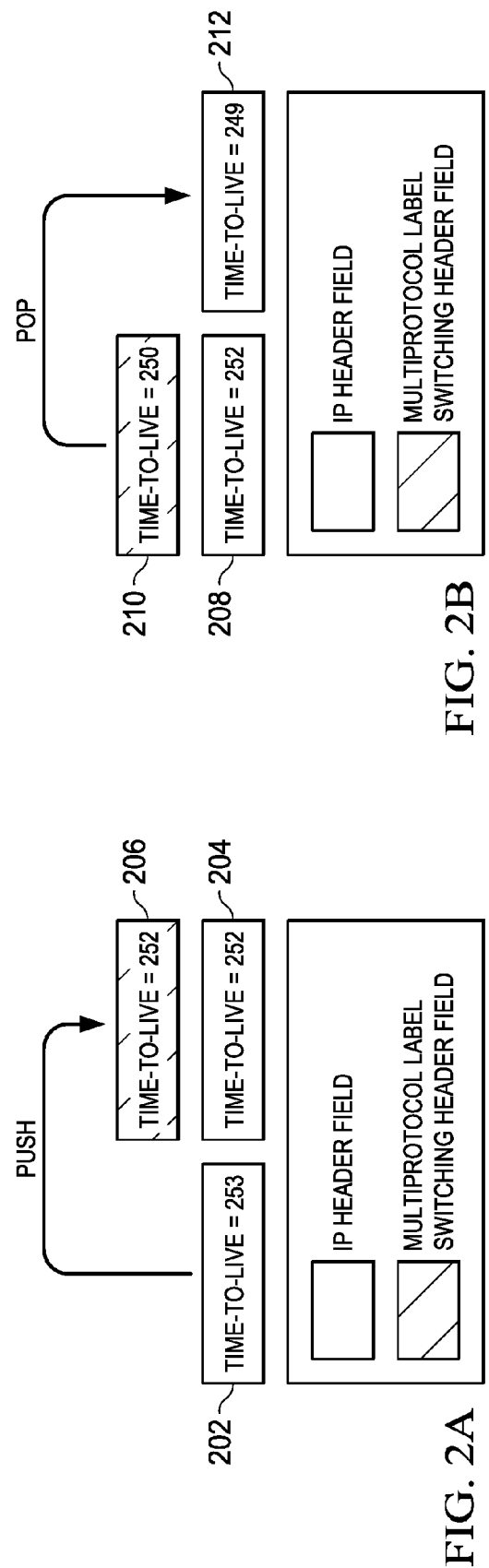
FIG. 2A
FIG. 2B

CONDITIONAL INSTRUCTIONS FOR PACKET PROCESSING

This continuation application claims priority to U.S. patent application Ser. No. 14/169,975, filed Jan. 31, 2014 (now U.S. Pat. No. 9,313,124), which claims priority to and the benefit of U.S. Provisional Application No. 61/759,673, filed Feb. 1, 2013, both of which are incorporated herein by reference.

BACKGROUND

The signals sent and received by a network device, such as a router or a switch, represent communication packets in a network. The packet may include information regarding the destination of the packet, a data payload, and/or how long the packet should be routed in the network (e.g., maximum number of hops). The router may, based on the information of a received packet, process or modify the received packet to forward the processed packet.

SUMMARY

Systems to execute an instruction to copy a time-to-live (TTL) filed in a packet are disclosed herein. In an embodiment, a network switch includes a plurality of ports, a parser coupled to the plurality of ports, and a processor coupled to the parser and configured to process a received packet via one of the ports. The received packet includes a first header field, a second header field, and a destination header field, each of the first, second, and destination header fields including a TTL field. The parser is configured to decide a valid bit for each of the first header field, the second header field and the destination header field, based on an availability for each of the first header field, the second header field and the destination header field. The processor is configured to execute an instruction to cause, based on the valid bits of the first and second header fields, content of a select one of the first or second header field's TTL field to be copied to the destination header field.

In another embodiment, a packet processing switch includes a plurality of ports, a parser coupled to the plurality of ports, and a processor coupled to the parser. The processor includes a plurality of logic units, and each of the logic units is configured to execute an instruction in a packet received on one of the ports. The received packet includes a first header field, a second header field, and a destination header field, each of the first, second, and destination header fields including a TTL field. The parser, based on a presence of the first header field, the second header field and the destination header field in the packet received over one of the ports, is configured to determine a valid bit for each of the first header field, the second header field and the destination header field. The logic unit executes the instruction to cause the processor to copy the first header field's TTL field to the destination header field, based on a first condition that requires the valid bit for the first header field is true, the valid bit for the second header field is false, and the valid bit for the destination header field is true.

In accordance with a further embodiment, a packet processing switch includes a plurality of ports, a parser coupled to the plurality of ports, and a processor coupled to the parser. The processor includes a plurality of logic units, and each of the logic units is configured to execute an instruction in a packet received on one of the ports. The received packet includes a first header field, a second header field, and a destination header field, each of the first, second, and destination header fields including a TTL field. The parser, based on a presence of the first header field, the second header field and the destination header field in the packet received over one of the ports, is configured to determine a valid bit for each of the first header field, the second header field and the destination header field. The logic unit executes the instruction to cause the processor to, if a first condition is met, copy the first header field's TTL field to the destination header field, and else if a second condition is met, copy the second header field's TTL field to the destination header field. The first condition includes the valid bit for the first header field is true, and the valid bit for the destination header field is true. The second condition includes the valid bit for the second header field is true, and the valid bit for the destination header field is true.

BRIEF DESCRIPTION OF THE DRAWINGS

For a detailed description of exemplary embodiments of the invention, reference will now be made to the accompanying drawings in which:

FIG. 1 shows an example of a network in accordance with various implementations;

FIG. 2a shows an example of copying a multiprotocol label switching (MPLS) header field in accordance with various implementations;

FIG. 2b shows another example of copying an MPLS header field in accordance with various implementations;

NOTATION AND NOMENCLATURE

Figure 3:
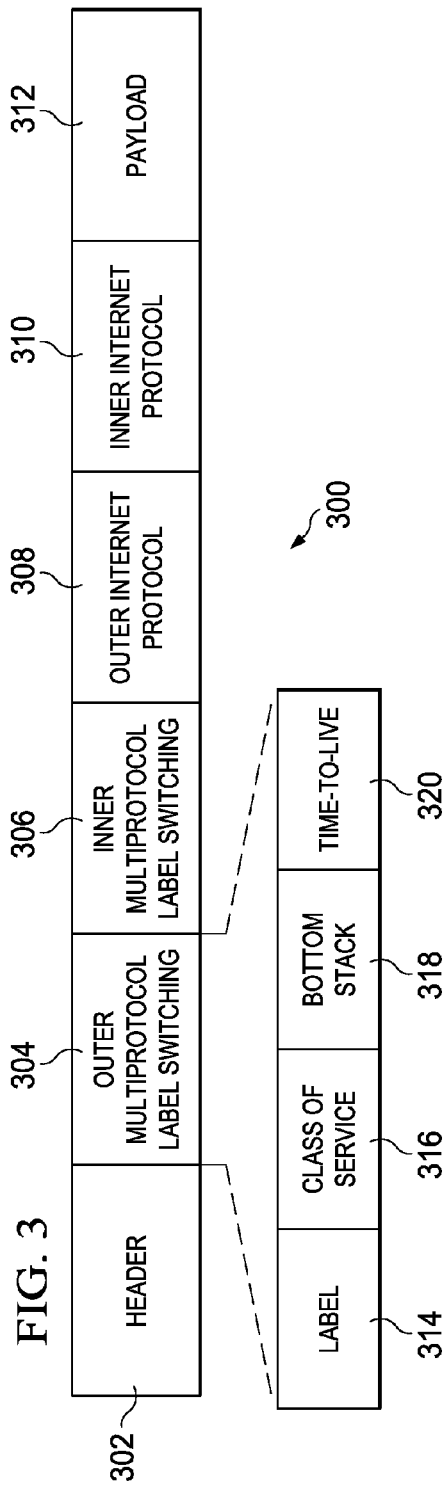
FIG. 3 shows an example of a packet in accordance with various implementations.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Internetwork communications are based on operations of routers, which are network devices that determine, on the basis of destination information in packets that the routers receive, where to forward the packets so that they are likely to reach the intended destinations. More specifically, the routers may comprise one or more network switches, or switches, configured to manipulate a received packet, for example, modifying and/or forwarding a packet. In general, the term "switch" is used herein, but that term includes any type of network packet routing hardware including switches, routers, hubs, and the like.

In general, even a high-performance switch may have a limited resource, especially time, to process each of the received packets. For example, for a 64 port switch, where each channel is 10 Gb per second, a total bandwidth of the switch is 640 Gb/sec. If a minimum Ethernet packet size of 64 bytes associated with an approximately 16 bytes inter-packet gap is used, the maximum packet rate for such a switch is approximately 960 M packets per second. Given an approximate 40 MHz bandwidth spare, a hardware packet processing pipeline needs to operate, for example at 1 GHz, to receive one packet flowing through the pipeline every clock cycle. Thus, to manipulate packets using a hardware switch requires that either the switch completes its dedicated function within a single clock cycle, or a pipelined architecture of the switch is used. In either of the cases, a hardware switch cannot be reused multiple times to perform multiple computations for an individual packet. Further, a plurality of either identical or different switches may be integrated on a chip to provide better performance. Such performance requirements may necessitate an increase in the complexity of the hardware, which may in turn increase cost. As a result, a simple hardware switch may be desirable to strike an optimal balance between performance and cost.

A time-to-live (TTL) field in a packet (e.g., an Internet Protocol (IP) packet) contains a value that is initialized to a particular value (e.g., 255) and is decremented each time the packet passes through a switch. The difference between the initial value and the current value of the TTL field indicates the number of hops that the packet has currently experienced in the network on its way to a destination node. The TTL field is used by a network switch to determine whether or not the packet has been in the network too long and, if so, the packet should be discarded. Any of a variety of reasons may cause a packet not to be delivered to its destination in a reasonable period of time (number of hops). It is possible for a packet to be caught in an endless loop while being routed. The TTL field can guard against such conditions. Upon determining that a packet has failed to be delivered to its destination within a preset number of hops, the packet may be discarded (dropped). Further, a message may be sent to the originator to decide whether or not to resend the packet. Generally, a hop count is implemented to record the TTL field for each transition between switches (i.e., a hop). Thus, effectively tracking the hop count may advantageously benefit a switch, or a network comprising the switch as a whole to be better managed.

Embodiments of the present invention provide a pipelined architecture to execute a "conditional move" instruction and/or a "conditional multiplexing" instruction to perform a copy-TTL operation. By executing such instructions in the proposed architecture, a comprehensive copy-TTL operation is recognized, which may advantageously decrease the hardware complexity while increasing performance.

FIG. 1 shows an example of a network 100 including a plurality of routers (102-110) to process a packet 101 in accordance with various implementations. As shown in FIG. 1, an incoming Internet Protocol (IP) packet 101 may enter the network 100 at the router 102, travel through routers 104-108, and leave the network 100 at the router 110. The IP is the principal communication protocol to relay datagrams of a packet across the network 100. More particularly, the network 100 comprises a multiprotocol labeling switch (MPLS) domain 120.

The MPLS is a forwarding scheme in which packet forwarding is based on one or more MPLS labels included in the packet. Details of the MPLS label will be described in accordance with an MPLS-labeled packet in FIGS. 2 and 2b. In IP network routing (i.e., a network without an MPLS domain), a router (e.g., the router 102 and 110) uses the information in an IP header field to determine the next hop (next router) for forwarding the packet 101. The IP header field may include a plurality of long network addresses, and to route the packet 101 may require multiple complex lookups in one or more routing tables. In contrast, the MPLS label, or the MPLS header field, uses a short path label to route the packet in the network (e.g., the MPLS domain 120).

Still referring to FIG. 1, the routers 104 and 108 may be a label edge router (LER), and the router 106 may be a label switch router (LSR) or transit router. The LER (e.g., 104 and 108) is a router that operates at the edge of the MPLS domain 120 and is configured to be an entry and exit point of the MPLS domain 120. The LSR (e.g., 106) in the MPLS domain 120 is a router that performs packet routing based only on the MPLS header field, which generally locates in the middle of the MPLS domain 120. During the routing of the packet 101, the LER 104 may "push" an MPLS header field onto the packet 131 (i.e., add one or more MPLS labels to the packet), and the LER 108 may "pop" an MPLS header field (i.e., remove one or more MPLS labels from the packet 133). As mentioned above, the TTL field plays a crucial role to prevent a packet from routing in a network indefinitely. Each of the header fields, for example the MPLS header field and the IP header field, includes a TTL field. Details of the pushing and popping of the header fields will be explained in FIG. 2a and FIG. 2b.

FIG. 2a and FIG. 2b, respectively, show examples of pushing and popping a header field (e.g., 206 and 210) of a packet in accordance with various embodiments. In FIG. 2a, a packet (e.g., the packet 131 in FIG. 1) with an IP header field 202 includes a TTL header field, and the packet enters to the MPLS domain 120 resulting in "pushing" a new MPLS header field to the packet. Each of the header fields, 202, 204 and 206, has a TTL field and each TTL field has a TTL field value as is labeled in FIG. 2a. For example, packet 131 (FIG. 1) may have IP header field 202 with a TTL field value of 253. After being forwarded by the LER 104 in FIG. 1, the TTL field value 253 of the IP header field 202 is copied to a new "pushed" MPLS header field 206 while also being decremented by 1. As a result, the packet 131, after being forwarded by the LER 104, now has the MPLS header field 206 with a TTL field value of 252 and the original IP header field 204 has a TTL field value of 252 as well.

Similarly, FIG. 2b shows a packet (e.g., the packet 133 in FIG. 1) with an IP header field 208 and an MPLS header field 210 being "popped" to remove the MPLS header field 210 (i.e., only an IP header field 212 is left). Each of the header fields 208, 210 and 212 has a TTL field and each TTL field has a TTL field value as shown in FIG. 2b. For example, before the MPLS header field 210 being popped, the packet includes the MPLS header field 210 with a TTL field value of 250 and the IP header field 208 with a TTL field value of 252. As described above, after the LER 108 forwards the packet 133 (i.e., exiting the MPLS domain 120), the MPLS header field 210 is removed and the MPLS header field 210's TTL field value 250 is copied to the IP header field 212 while being decremented by 1. More specifically, the packet after being forwarded by the LER 108 now has no MPLS header field and the IP header field 212 has a TTL field value of 249.

Although FIG. 2a and FIG. 2b show only copying header fields at the edges of the MPLS domain 120, the copy operation of header fields may occur at each hop during the packet routing in a network (e.g., 100). For example, if a packet only routes in a network without a MPLS domain (e.g., 120), only IP header fields will be copied during the forwarding via a router (e.g., 102). Similarly, if a packet only routes in a MPLS domain (e.g., 120), only MPLS header fields will be copied during the forwarding via a router (e.g., 106).

FIG. 3 shows an example of a packet 300 including an MPLS header field (e.g., 304 and 306) in accordance with various embodiments. The packet 300 includes a header field 302, an outer MPLS field 304, an inner MPLS field 306, an outer IP field 308, an inner IP field 310 and a payload 312. The header 302 may include source and destination information for the packet 300. The payload 312 may include the actual payload of packet 300. Generally, a first MPLS field or a first IP field refers to an "outer" field, and a second MPLS field or a second IP field refers to an "inner" field. A packet may include zero, one or more MPLS fields or IP fields, which means that the packet may have a plurality of combinations of the MPLS and IP header fields. For example, if a packet has only one MPLS header field and one IP header field, the packet has only one outer MPLS header field and one outer IP header filed.

Still referring to FIG. 3, each of the MPLS and IP header fields (e.g., 304-310) includes a TTL field (e.g., 320). More specifically, no matter whether an MPLS header field is outer or inner, the MPLS header field (e.g., 304 and 306), generally a 4-byte field, includes a 20-bit label 314, a 3-bit class of service (CoS) identifier 316, a bottom stack (S) bit 318, an 8-bit TTL field 320. The label 314 includes information to identify a next hop for the packet 300. The CoS identifier 316 indicates the class of service with which the packet should be handled. The bottom stack bit 318 may indicate whether the MPLS header field 304 is the bottom header field in a stack of header fields. In a preferred embodiment, a valid bit may be generated, by a parser, to indicate a presence of the TTL field 320. For example, if a packet contains an outer MPLS header field, the valid bit is set to one by the parser otherwise the valid bit is set to zero. Details of the parser will be discussed in accordance with an architecture in FIG. 4. As mentioned above, the TTL field 320 includes a TTL field value that may identify a number of hops over which the packet 300 may be routed. As such, the TTL field 320 is used by a network device such as a router or a switch to determine whether or not the packet has been in the network too long.

Since each of the MPLS and IP header fields includes an individual TTL field, an outermost (first appears in a packet) TTL field is defined as an outer-TTL field, and a secondary outermost (secondary appears in the packet) TTL field is defined as an inner-TTL field. For example, if a packet only includes an MPLS header field and an IP header field, the MPLS field is the outer MPLS header field and the TTL field in the outer MPLS header field is referred to as the outer-TTL field. Analogously, the IP header field is the outer IP header field and the TTL field in the outer IP header field refers to the inner-TTL field. Table 1 shows all the possibilities (i.e., 9 possibilities: from 1 to 9 as labeled in the first column of the Table 1) of where an inner-TTL field and an outer-TTL field may be located. By "-" it is meant an absence of a header field. By "y" it is meant that a presence of a header field but the header field is neither outer nor inner. For example, referring to the $9^{th}$ possibility, a packet includes an outer MPLS header field, an inner MPLS header field, an outer IP header field and an inner IP header field. As defined above, the outermost TTL field is the outer-TTL field so that the TTL field in the outer MPLS header field is the outer-TTL field. Further, the packet includes a second MPLS header field, which refers to as the inner MPLS header field by the above description. Similarly, the TTL field in the inner MPLS header field refers to as the inner-TTL field. Even though the outer IP header field and the inner IP header field have its individual TTL field, neither of them is located in the outermost or the secondary outermost location of the packet so that each of them is labeled as "y".

Based on the definition of the inner-TTL field and the outer-TTL field, in some preferred embodiments, the operations to copy the TTL field may be categorized into two: one is referred to as a copy-TTL inward operation; the other is referred to as a copy-TTL outward operation. The copy-TTL inward operation means that the operation is configured to copy the TTL field from the outer-TTL field to the inner-TTL field. The copy-TTL outward operation means that the operation is configured to copy the TTL field from the inner-TTL field to the outer-TTL field. Generally, the copy-TTL inward operation and the copy-TTL outward operation occur at the edge(s) of the network (e.g., the edge routers 104 and 108).

Back referring to Table 1, at the $6^{th}$ and $7^{th}$ columns, "Copy inward" refers to the copy-TTL inward operation, and "Copy outward" refers to the copy-TTL outward operation. More specifically, for each possibility of an inner-TTL field's and an outer-TTL field's locations, the $6^{th}$ column refers to where a TTL field is copied from and to. For example, using the $5^{th}$ possibility, the outer-TTL field is located in the outer MPLS header field and the inner-TTL field is located in the outer IP header field. Thus, the copy-TTL inward operation is from the MPLS header field to the IP header field, as shown in the $6^{th}$ column of the $5^{th}$ possibility. Similarly, the copy-TTL outward operation is from the IP header field to MPLS header field, as shown in the $7^{th}$ column of the $5^{th}$ possibility.

TABLE 1 inner-TTL field and outer-TTL field locations

| | Outer MPLS | Inner MPLS | Outer IP | Inner IP | Copy inward | Copy outward |
|---|---|---|---|---|---|---|
| 1 | — | — | — | — | X | |
| 2 | — | — | outer | — | X | |
| 3 | — | — | outer | inner | IP to IP | IP to IP |
| 4 | outer | — | — | — | X | |
| 5 | outer | — | inner | — | MPLS to IP | IP to MPLS |
| 6 | outer | — | inner | Y | MPLS to IP | IP to MPLS |
| 7 | outer | inner | — | — | MPLS to MPLS | MPLS to MPLS |
| 8 | outer | inner | y | — | MPLS to MPLS | MPLS to MPLS |
| 9 | outer | inner | y | Y | MPLS to MPLS | MPLS to MPLS |

The present embodiments of the invention disclose two instructions to implement all possibilities from and to which a copy of the TTL fields may occur. The first instruction is referred to as a conditional move instruction; the second instruction is referred to as a conditional multiplexing instruction. For any particular possibility in Table 1, only one of these two instructions is needed. As such, executing the disclosed instructions, by an implemented architecture, may increase likelihood to perform the packer processing in a switch more efficiently. The embodiments of the disclosed architecture will be described with respect to FIG. 4.

For a purpose of clarity, some notations are defined as follows.

| | |
|---|---|
| s1 | a first header field |
| vs1 | a valid bit for the first header field |
| s2 | a second header field |
| vs2 | a valid bit for the second header field |
| d | a destination header field |
| vsd | a valid bit for the destination header field |

Each of the first header field, second header field, and the destination header field may be: (a) an IP header field, (b) an outer MPLS header field, (c) an inner IP header field, or (d) an inner MPLS header field.

The conditional move instruction is hereafter referred to as "cond-move". The function and arguments are denoted as follows: (cond-move-v12 vs1 vs2 vd s1). The operation is defined as: when (vs1 and vsd and not(vs2)) then copy s1 to d. The functional notation lists all the arguments necessary for establishing whether a move occurs and supplying the data, or a TTL field, for the move (i.e., copy). The output of this function is placed in the destination. A condition has to be met to perform the move. The condition includes that s1 is valid, d is valid and s2 is not valid, which means that the valid bit for the first header field is true (i.e., value=1), the valid bit for the destination header field is true (i.e., value=1) and the valid bit for the second header field is false (i.e., value=0).

A second form of the first instruction, cond-move, omits the qualification of vs2 to be invalid. The second form, "cond-move-v1", of the cond-move may be referred to as: (cond-move-v1 vs1 vd s1). The operation is defined as: when (vs1 and vsd) then copy s1 to d, which means that a condition has to be met to perform the move. The condition includes that the valid bit for the first header field is true and the valid bit for the destination header field is true.

The conditional multiplexer is hereafter referred to as "cond-mux". The function and arguments of the instruction are denoted as follows: (cond-mux vs1 vs2 vd s1 s2). The operation is defined as: when vsd, (if vs1 then copy s1→d else if vs2 then copy s2→d). Unless the destination d is valid, no operation occurs. Cond-mux provides two options to choose from which a TTL field will be copied based on which of two conditions has been met. If a first condition is met, a TTL field in the first header field will be copied to the destination header field; else if a second condition is met, a TTL field in the second header field will be copied to the destination header field. The first condition includes that the valid bit for the first header field is true (i.e., vs1=1); the second condition includes that the valid bit for the second header field is true (i.e., vs2=1).

The definitions for the disclosed instructions, cond-move-v12, cond-move-v1, and cond-mux are shown in Table 2 where "/" is defined as a not operator.

TABLE 2

| | |
|---|---|
| cond-move-v12 | when (and vs1 vsd/vs2) then copy s1 −> d |
| cond-move-v1 | when (and vs1 d) then copy s1 −> d |
| cond-mux | when vd (if vs1 then copy s1 −> d else if vs2 then copy s2-d) |

By implementing the first instruction (cond-move-v12 and cond-move-v1) and the second instruction (cond-mux), each of the possibilities in Table 1 may be covered. Consider an example: s1 (the first header field) is an outer MPLS header field, s2 (the second header field) is an inner MPLS header field, and d (the destination header field) is an outer MPLS header field. If the outer MPLS header field (i.e., vsd=1) is valid, the inner MPLS header field (i.e., vs2=1) is invalid, and the outer IP header field (i.e., vs1=1) is valid, the outer MPLS header field's TTL field is copied to the outer IP header field's TTL field by executing the first form of the first instruction, cond-move-v12, which is the 5$^{th}$ possibility of performing the copy-TTL inward operation in Table 1. In another example, the copy-TTL inward operation for the inner MPLS header field to be the destination header field is performed by executing the second form of the first instruction cond-move-v1, which covers the copy-TTL inward operations of 7$^{th}$ to 9$^{th}$ possibility in Table 1. If the outer MPLS header field (i.e., s1) and the inner MPLS header field (i.e., d) are valid, the outer MPLS header field's TTL field is copied to the inner MPLS header field's TTL field. In the other example, the copy-TTL outward operation for the outer MPLS header field to be the destination header field may be performed by executing the second instruction, cond-mux. If the outer MPLS header field (i.e., d) is valid, then if the inner MPLS header field (i.e., s1) is valid the inner MPLS header field's TTL field is copied to the outer MPLS header field's TTL field, otherwise if the outer MPLS header field is valid and the outer IP header field (i.e., s2) is valid, the outer IP header field's TTL field is copied to the outer MPLS header field's TTL field. Executing the cond-mux instruction covers the copy-TTL outward operations of 5$^{th}$ to 9$^{th}$ possibility in Table 1.

In accordance with various embodiments, all the possibilities (1$^{th}$ to 9$^{th}$) in Table 1 may be comprehensively covered by the instructions, cond-move-v12, cond-move-v1 and cond-mux. Table 3 shows instruction and operands for all possibilities of combinations of the destination header field, the first header field, the second header field, and the corresponding instruction to perform the copy-TTL inward operations and the copy-TTL outward operations. In Table 3, O-IP stands for the outer IP header field; O-MPLS stands for the outer MPLS header field; I-IP stands for the inner IP header field; I-MPLS stands for the inner MPLS header field. More specifically, for the definition column, OI stands for the outer IP header field; OM stands for the outer MPLS header field; II stands for the inner IP header field; IM stands for the inner MPLS header field.

TABLE 3

| Destination | Instruction | S1 | S2 | d | Definition |
|---|---|---|---|---|---|
| Copy-TTL inward operation | | | | | |
| inner IP | cond-move-v12 | O-IP | O-MPLS | I-IP | (when (and OI II/OM) OI −> II) |
| outer IP | cond-move-v12 | O-MPLS | I-MPLS | O-IP | (when (and OM OI/IM) OM −> OI) |
| inner MPLS | cond-move-v1 | O-MPLS | — | I-MPLS | (when (and OM IM OM −> IM)) |
| Copy-TTL outward operation | | | | | |
| outer IP | cond-move-v12 | I-IP | O-MPLS | O-IP | (when (and II OI/OM) II −> OI) |
| outer MPLS | cond-mux | I_MPLS | O-IP | O-MPLS | (when (and OM(or OI IM))) (if if IM IM −> OM) (else OI OI −> OM) |

In accordance with some alternate embodiments, a generalized conditional move is disclosed. It is similar to the cond-move-v12 instruction, except for that the three separate predicate tests (i.e., tests for vs1, vs2 and vsd) can be individually bypassed. The generalized cond-move instruction may require an input of a first header field, a valid bit for the first header field, a destination header field, a valid bit for the destination header field, and a valid bit for a second header field. This is similar to the cond-move-v12 instruction described above. A difference is that a plurality of option bits encoded in the instruction enable or disable each predicate test and an additional option bit reverses the required polarity of the second header field. As such, the generalized cond-move instruction can be represented as follows:

(cond-move vs1 vs2 vsd s1 test-vs1 test-vs2 test-vsd reverse-vs2-sense)

The function of this instruction is
(when (and (or /test-vs1 vs1)
  (or /test-vs2 (xor vs2 reverse-vs2-sense))
  (or /test-vsd vsd))
copy s1->d)

As shown above, the function is similar to cond-move-v12, except that each predicate test can be selectively disabled (i.e., making that test always pass). More particularly, the predicate test includes three tests, and each of the tests can be disabled, or passed, by a user based on plural associated option bit. If all the three tests are passed, the instruction will copy the first header field's TTL field to the destination header field.

The first test includes checking if the valid bit for the first header field (i.e., vs1) is true or if a first-test-enable bit (i.e., test-vs1) is false. A false first-test-enable bit means that there is no need to check whether the first header field is valid or not. If vs1 is true or the first-test-enable bit is false, then the first test is true, which means the first test is passed.

The second test includes an "exclusive or" operation of the valid bit for the second header field (i.e., vs2) and a second-test-polarity-reverse bit (i.e., reverse-vs2-sense). More particularly, the sense of vs2 can be reversed, so that the vs2 is required to be 1 (valid) rather than 0 (invalid). The second test further comprises checking if the second-test-enable bit (i.e., test-vs2) is false. If test-vs2 is false or output of the exclusive or operation is true, then the second test is true, which means the second test is passed.

The third test includes checking if the valid bit for the destination header field (i.e., vsd) is true or if a third-test-enable bit (i.e., test-vsd) is false. A false third-test-enable bit means that there is no need to check whether the destination header field is valid or not. If vsd is true or the third-test-enable bit is false, then the third test is true, which means the third test is passed.

Setting all option bits test-vs1, test-vs2, test-vsd, and reverse-vs2-sense to 1 creates the cond-move-v12 instruction. Setting the test-vs2 flag to 0 and the test-vs1 and test-vsd flags to 1 (the reverse-vs2-sense flag is a don't-care since vs2 is not being tested) creates the cond-move-v1 instruction. Setting all flags to 0 creates an unconditional move instruction. Other options are also useful, such as turning off the test-vsd flag, which enables a move to a previously invalid location.

Still in accordance with some alternate embodiments, the cond-mux instruction may also be generalized by providing the instruction with a flag to enable or disable the requirement that the valid bit for the destination header field (vsd) needs to be true. The second second-test-enable bit, test-vs2, can disable the vs2 test. The resulting instruction is (cond-mux vs1 vs2 vd s1 s2 test-vd test-vs2)

The function of the instruction is
(when (or /test-vsd vd)
  (if vs1 s1->d
    else if (or /test-vs2 vs2) s2->d))

As shown above, executing the generalized cond-mux instruction causes the first header field's TTL field to be copied by the destination header field when the valid bit for the destination header field (vs1) is true or the destination-test-enable bit (test-vsd) is false, otherwise the generalized cond-mux instruction causes the second header field's TTL field to be copied by the destination header field when the valid bit for the second header field (vs2) is true or the destination-test-enable bit (test-vsd) is false.

In some preferred embodiments, all the option bits, the first-test-enable bit, the second-test-polarity-reverse bit, the second-test-enable bit and the third-test-enable bit may be encoded in the generalized cond-move or cond-mux instruction.

Figure 4:
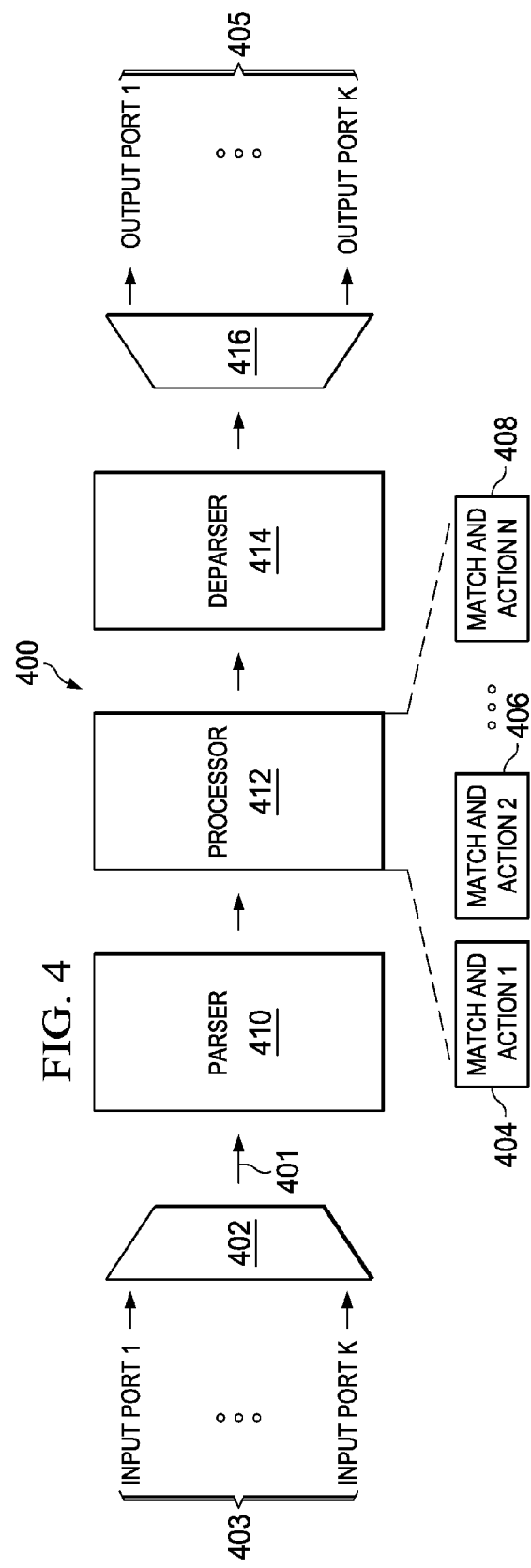
FIG. 4 shows an example of a network switch in accordance with various implementations.

FIG. 4 shows an example of a switch 400 including a processor 412 to process a packet via executing the disclosed instructions. The switch 400 includes an input multiplexer 402, a parser 410, the processor 412, a deparser 414, and an output multiplexer 416. The input multiplexer 402 is configured to rotate among several input ports 403 to transmit a packet 401 to the parser 410, where the output multiplexer 416 configured to rotate among several output ports 405 to transmit the processed packet 401. The parser 410 translates the representation of the packet into one where header fields of the packet are put into standardized locations in a packet field, and the deparser 416 shares a similar function, essentially undoing the parsing action of the parser 410. For example, a packet has predetermined locations for all header fields, such as MAC source and destination addresses, ethertype, IP source and destination addresse, IP type, TCP input and output port numbers, and MPLS header field (e.g., 304 and 306 in FIG. 3), etc. Any individual packet may or may not contain specific header fields, but if the packet does contain the header field, it is put into the predetermined location for that header field in the packet. More particularly, referring to the MPLS header field (e.g., 304 and 306) in FIG. 3, if the packet 300 does include the header field, after the packet being parsed by the parser 410, a true valid bit (i.e., the valid bit for the header field is true) for the header field will be received by the processor 412.

Still referring to FIG. 4, the processor 412 includes a plurality of pipelined match and action (M&A) engines 404, 406 and 408. In some preferred embodiments, each of the M&A engines may be implemented as a very long instruction word (VLIW) engine, and each of the VLIW engine may include 224 arithmetic logic units (ALUs), or logic units. Each of the logic units is configured to execute a plurality of instructions including but not limited to the disclosed cond-move and cond-mux instructions. The plurality of the instructions executed by the logic unit may be configured to modify the received packet (e.g., 401), to output the processed packet to a particular output port, and to provide an index of a next match table to use.

In accordance with some preferred embodiments, methods of implementing the present instructions are disclosed herein. Executing the first instruction cond-move in the first form, cond-move-v12, by the logic unit, causes the switch 400 to process a received packet based on a first condition. The received packet may include the first header field, the second header field, and the destination header field. Each of the header fields includes an associated TTL field. If the first condition is met, the switch 400 copies the TTL field associated with the first header field to the TTL field associated with the destination header field, wherein the first condition comprises: the valid bit for the first header field is true, the valid bit for the second header field is false, and the valid bit for the destination header field is true. Further, executing the first instruction cond-move in the second form, cond-move-v1, by the logic unit, causes the switch 400 to process a received packet based on a second condition. If the second condition is met, the switch 400 copies the TTL field associated with the first header field to the TTL field associated with the destination header field, wherein the second condition comprises: the valid bit for the first header field is true and the valid bit for the destination header field is true. Still referring to the methods, executing the second instruction cond-mux, by the logic unit, causes the switch 400 to copy the TTL field associated with the first header field to the TTL field associated with the destination header field if a first data move condition is met, otherwise to copy the TTL field associated with the second header field to the TTL field associated with the destination header field else if a second data move condition is met. More particularly, the first data move condition includes the valid bit for the first header field is true and the valid bit for the destination header field is true, and the second data move condition includes the valid bit for the second header field and the valid bit for the destination header field is true.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network switch, comprising:
   a plurality of ports;
   a parser coupled to the plurality of ports; and
   a processor, coupled to the parser, to receive a packet via one of the ports, the received packet including a first header field, a second header field and a destination header field, each of the first, second and destination header fields including a respective time-to-live (TTL) field;
   the parser being configured to decide a respective valid bit for each of the first, second and destination header fields, based on an availability for each of the first, second and destination header fields; and
   the processor being configured to execute an instruction to copy the first header field's TTL field to the destination header field's TTL field if a first data move condition is met in which the first header field's valid bit is true and the destination header field's valid bit is true, and otherwise to copy the second header field's TTL field to the destination header field's TTL field if a second data move condition is met in which the second header field's valid bit is true and the destination header field's valid bit is true.

2. The network switch of claim 1, wherein at least one of the first header field, the second header field and the destination header field is selected from a group consisting of: (a) an outer internet protocol (IP) header field, (b) an outer multiprotocol label switching (MPLS) header field, (c) an inner IP header field, and (d) an inner MIMS header field.

3. The packet processing switch of claim 1, wherein a first-test-enable bit, a second-test-enable bit and a third-test-enable bit are encoded in the instruction.

4. The network switch of claim 1, wherein the processor is configured to execute the instruction to copy the first header field's TTL field to the destination header field's TTL field if the first data move condition is met in which the first header field's valid bit is true and the destination header field's valid bit is true, and in which the second header field's valid bit is false.

5. The network switch of claim 1, wherein the processor includes a plurality of logic units, each configured to execute the instruction.

* * * * *